United States Patent [19]

Stillwagon et al.

[11] Patent Number: 5,467,619
[45] Date of Patent: * Nov. 21, 1995

[54] POST LATCHING SYSTEMS

[75] Inventors: Woodrow C. Stillwagon, Atlanta, Ga.;
Donald Embry, Cloverport, Ky.

[73] Assignee: Star Lock Systems, Inc., Hilliard, Ohio

[*] Notice: The portion of the term of this patent subsequent to Dec. 13, 2007, has been disclaimed.

[21] Appl. No.: 106,436

[22] Filed: Aug. 13, 1993

Related U.S. Application Data

[63] Continuation-in-part of Ser. No. 834,248, Feb. 13, 1992, abandoned, which is a continuation-in-part of Ser. No. 403,665, Sep. 6, 1989, Pat. No. 5,022,243, and a continuation-in-part of Ser. No. 11,196, Jan. 29, 1993, abandoned, which is a continuation of Ser. No. 698,917, May 13, 1991, Pat. No. 5,197,314, which is a continuation of Ser. No. 557,305, Jul. 23, 1990, Pat. No. 5,050,413, which is a continuation of Ser. No. 358,888, May 30, 1989, Pat. No. 5,027,630, which is a continuation-in-part of Ser. No. 327,250, Mar. 22, 1989, Pat. No. 4,900,182.

[51] Int. Cl.⁶ .................................................. E05B 67/36
[52] U.S. Cl. ........................ 70/34; 70/386; 70/208; 403/325; 292/58
[58] Field of Search .................... 70/14, 34, 207, 70/208, 224, 215–217, 306, 386, 387, 490, 491, 365, 378, 418, 419; 292/57–62, 251

[56] References Cited

U.S. PATENT DOCUMENTS

| | | | |
|---|---|---|---|
| 951,836 | 3/1910 | Noack | 403/383 |
| 1,234,212 | 7/1914 | Renaux | |
| 1,499,444 | 1/1923 | Caillois | |
| 1,577,678 | 4/1925 | Behrman | |
| 1,592,696 | 7/1926 | Heyer | 70/34 |
| 1,829,760 | 12/1928 | Santiago | |
| 1,967,627 | 7/1934 | Riley | 292/340 |
| 1,975,877 | 4/1933 | Thomas | 279/93 |
| 2,062,628 | 1/1935 | Yannetta | 287/58 |
| 2,514,760 | 9/1948 | Hanson et al. | 294/102 |
| 2,826,855 | 11/1956 | Troccia | 43/44.83 |
| 3,089,329 | 12/1961 | Kerr | 70/135 |
| 3,089,330 | 12/1961 | Kerr | 70/140 |
| 3,111,833 | 11/1963 | Dertmer | |
| 3,122,012 | 2/1964 | Christopher | 70/140 |
| 3,177,543 | 4/1965 | Fountain | 24/126 |
| 3,186,196 | 6/1965 | Moberg | 70/386 |
| 3,213,654 | 10/1965 | Davenbaugh et al. | 70/208 |
| 3,222,899 | 12/1965 | Bodoh et al. | 70/140 |
| 3,234,765 | 2/1966 | Kerr | 70/208 |
| 3,240,519 | 3/1966 | Weasler | 287/119 |
| 3,260,541 | 7/1966 | Sadler et al. | 287/53 |
| 3,285,043 | 11/1966 | Davenbauch | 70/208 |
| 3,299,678 | 1/1967 | Spencer | 70/208 |

(List continued on next page.)

*Primary Examiner*—Peter M. Cuomo
*Assistant Examiner*—Suzanne L. Dino
*Attorney, Agent, or Firm*—Louis T. Isaf; James A. Witherspoon

[57] ABSTRACT

A latching system, in accordance with a first preferred, embodiment of the present invention, comprises a notched post assembly, a post gripping assembly and a handle assembly, and, in preferred embodiments, a lock assembly associated with the handle assembly. The notched post assembly is comprised of an elongated post formed at one end with at least two opposing, axially extending rows of notches or teeth and alternately disposed smooth surfaces. The post gripping assembly comprises a channel for accepting the notched end of the post and comprises movable latch elements which cooperate with the notches of the post to effect the primary latching function of the system. The unlatching of the post from the channel is accomplished by rotating the post to disengage the notches and the latch elements. A latch, in accordance with a second preferred embodiment of the present invention, comprises a post and collar gripping and release mechanism cooperatively mounted to the door and door frame of a vending machine, cabinet, or the like, to provide an initial latching function in the form of a frictional gripping of the post by the collar, and further comprises a lock assembly associated with the post and collar mechanism to provide a primary locking function and to effect release of the latching function.

86 Claims, 5 Drawing Sheets

U.S. PATENT DOCUMENTS

| | | | |
|---|---|---|---|
| 3,302,434 | 6/1964 | Davenbaugh et al. | 70/208 |
| 3,438,227 | 7/1966 | Wolniak | 70/208 |
| 3,454,002 | 7/1969 | Westlake et al. | 128/87 |
| 3,478,548 | 2/1968 | Finck | 70/397 |
| 3,507,508 | 4/1970 | Andrews | 279/83 |
| 3,525,242 | 7/1968 | Young | 70/231 |
| 3,550,412 | 4/1968 | Pitel et al. | 70/461 |
| 3,659,444 | 5/1972 | Wellekens | 70/208 |
| 3,738,134 | 2/1971 | Hall | 70/86 |
| 3,779,037 | 12/1973 | Petros et al. | 64/5 |
| 3,911,534 | 10/1974 | Martens et al. | 24/150 |
| 3,947,930 | 4/1975 | Martens et al. | 24/155 |
| 3,948,362 | 4/1975 | Greest | 188/65.2 |
| 3,974,581 | 4/1975 | Martens et al. | 40/20 |
| 3,994,521 | 9/1975 | Van Gompel | 292/319 |
| 4,012,813 | 4/1975 | Martens et al. | 24/150 |
| 4,132,092 | 4/1978 | Steinbach | 70/208 |
| 4,141,117 | 6/1977 | Van Gompel | 24/136 |
| 4,165,195 | 8/1979 | Teramachi | 403/325 |
| 4,198,080 | 4/1980 | Carpenter | 285/277 |
| 4,221,025 | 12/1978 | Martens et al. | 24/150 |
| 4,236,395 | 12/1980 | Avaivsini | 70/34 |
| 4,328,687 | 7/1979 | Ritchie | 70/34 |
| 4,361,196 | 7/1980 | Hoyle, Jr. | 175/320 |
| 4,440,005 | 6/1982 | Bulle | 70/14 |
| 4,476,699 | 10/1984 | Dahlborg | 70/34 |
| 4,527,310 | 7/1983 | Vandebult | 24/150 |
| 4,548,060 | 11/1983 | Campbell | 70/91 |
| 4,552,001 | 11/1985 | Roop | 70/208 |
| 4,579,476 | 10/1984 | Post | 403/322 |
| 4,617,844 | 2/1985 | Batten | 81/436 |
| 4,637,234 | 8/1984 | Mielonen | 70/34 |
| 4,639,163 | 12/1984 | Buthe | 403/322 |
| 4,643,472 | 2/1987 | Schukei et al. | 294/94 |
| 4,656,698 | 11/1985 | Arakaws | 24/136 |
| 4,662,771 | 5/1987 | Roe et al. | 403/108 |
| 4,683,739 | 7/1986 | Hughes | 70/363 |
| 4,711,106 | 12/1987 | Johnson | 70/34 |
| 4,716,749 | 1/1987 | Johnson | 70/363 |
| 4,730,468 | 9/1986 | Becker | 70/34 |
| 4,760,721 | 8/1988 | Steinbach | 70/208 |
| 4,775,269 | 10/1988 | Brix | 408/239 |
| 4,796,930 | 1/1989 | Baynes | 292/58 |
| 4,834,573 | 6/1988 | Asano et al. | 403/344 |
| 4,838,060 | 6/1989 | Hutzenlaub | 70/491 |
| 4,859,110 | 8/1989 | Dommel | 403/325 |
| 4,865,485 | 7/1988 | Finnefrock, Sr. | 403/322 |
| 4,883,255 | 2/1988 | Bacon | 254/266 |
| 4,893,810 | 1/1990 | Lee | 272/123 |
| 4,898,523 | 12/1988 | Harwarth | 418/70 |
| 4,900,182 | 2/1990 | Stillwagon | 463/325 |
| 4,911,573 | 12/1988 | Pietro | 403/349 |
| 4,927,286 | 7/1988 | Hobluigie et al. | 403/322 |
| 4,946,130 | 11/1988 | Kooiman | 251/95 |
| 4,966,018 | 10/1990 | Hauber | 70/208 |
| 4,974,888 | 12/1991 | Childers | 292/251 |
| 4,993,247 | 2/1991 | Minemura | 70/208 |
| 5,022,243 | 6/1991 | Embry | 70/34 |
| 5,027,630 | 7/1991 | Stillwagon et al. | 70/386 |
| 5,050,413 | 9/1991 | Stillwagon et al. | 70/386 |
| 5,141,355 | 8/1992 | Stillwagon | 403/325 |
| 5,170,650 | 12/1992 | Kortenbrede | 70/386 |
| 5,197,314 | 3/1993 | Stillwagon et al. | 70/386 |

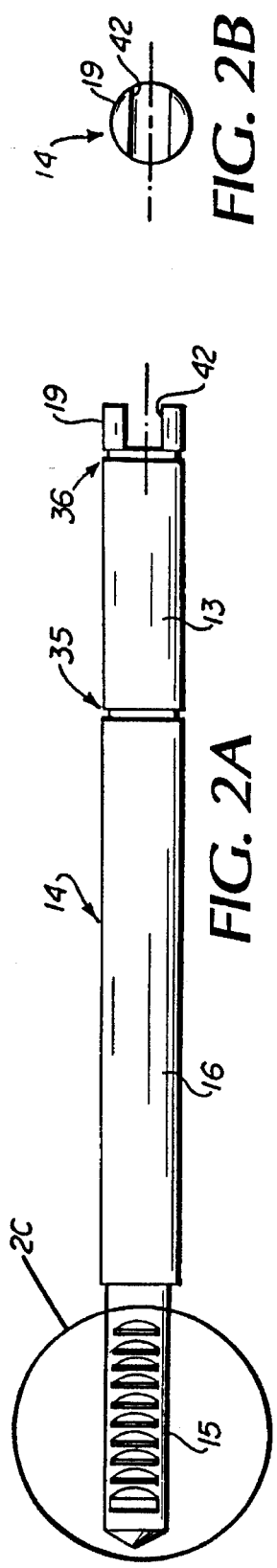
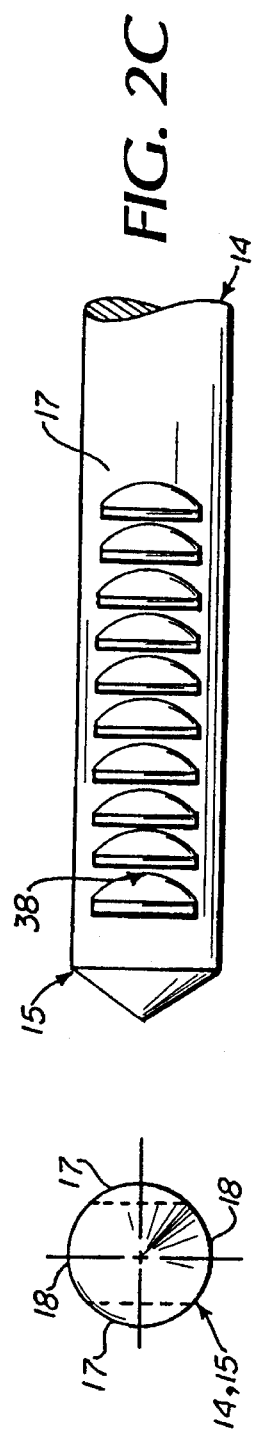
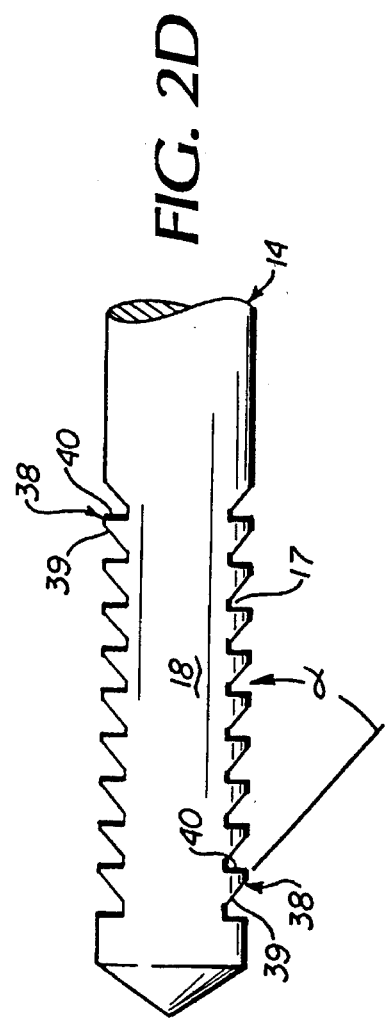

POST LATCHING SYSTEMS

CROSS-REFERENCE TO RELATED APPLICATIONS

This application is a continuation-in-part of application Ser. No. 07/834/248, filed Feb. 13, 1992 and now abandoned, which is a continuation-in-part of application Ser. No. 07/403,665, filed Sep. 6, 1989, now U.S. Pat. No. 5,022,243.

This application is also a continuation-in-part of application Ser. No. 08/011,196, filed Jan. 29, 1993 and now abandoned, which is a continuation of application Ser. No. 07/698,917, filed May 13, 1991, now U.S. Pat. No. 5,197,314, which is a continuation of application Ser. No. 07/557,305, filed Jul. 23, 1990, now U.S. Pat. No. 5,050,413, which is a continuation of application Ser. No. 07/358,888, filed May 30, 1989, now U.S. Pat. No. 5,027,630, which is a continuation-in-part of application Ser. No. 07/327,250, filed Mar. 22, 1989, now U.S. Pat. No. 4,900,182.

BACKGROUND OF THE INVENTION

This invention relates generally to the field of latching devices and, in its most preferred embodiments, to the field of key operated door latching devices.

A latching device holds lids, doors, and other closure pieces in a closed position on related boxes, cabinets, vending machines, doorways and other framed structures. When desired to maintain the structure secure, the latch mechanism is provided with a locking device, such as a keyed lock. There are great numbers of latching and locking devices available on the market, yet not all these devices are capable of meeting the needs of high security areas and/or withstanding the demands of high impact and abusive areas.

By way of example, but not limitation, one high security and abusive area requiring specially designed latching and locking devices is that of vending machines. Hordes of vandals have taken a large toll on the vending machine industry, pilfering millions of dollars yearly from destroyed or illegally accessed money boxes. Vandals use numerous methods, including the use of professional tools, with varying degrees of brutality, to open the door and access the money. Needless to say, the industry is desperately seeking new latching and locking devices which will thwart the efforts of the vandals and otherwise provide tight, secure and dependable latching and locking.

SUMMARY OF THE INVENTION

Briefly described, the first preferred embodiment of the present invention includes a notched post latching system. The latching system of the first preferred embodiment of the present invention comprises a notched post assembly, a post latching assembly, and a handle assembly. In preferred embodiments, the invented latching system also includes a lock assembly associated with the handle assembly. The post assembly and post latching assembly are, in a preferred application, cooperatively mounted each to one of a closure piece (hereinafter generally referred to as the "door") and a related framed structure (hereinafter generally referred to as the "door frame").

The notched post assembly is comprised, in at least one of its embodiments, of an elongated post formed at one end with at least two opposing, axially extending rows of notches or teeth. The post is mounted at its other end to a mounting assembly for rotation within the mounting assembly about the axis of the post. The post latching assembly comprises a channel for accepting the notched end of the post and comprises movable latch elements which cooperate with the notches of the post to effect the primary latching function of the system. The cooperation of the post notches and the latch elements allows for entry of the notched end of the post into the latching assembly channel, but resists removal of the post from the channel. Removal ("unlatching") of the post from the channel is accomplished by rotating the post to disengage the notches and the latch elements, thus allowing for removal of the post from the latching assembly.

Rotation of the post to effect unlatching is accomplished by action of the handle assembly. In its basic form, the preferred embodiment of the handle assembly includes a handle of some definition engaging, for example, the mounted end of the post. In the first preferred embodiment, the lock assembly performs the function of the handle as well as performs the primary locking function. The primary locking function is that function of preventing rotation, and thus preventing unlatching, of the post without proper operation of a key or appropriate combination or code. The lock assembly of the preferred embodiment is of a type typically known in the art.

In accordance with at least one embodiment of the first preferred embodiment, the mounting assembly (to which the post is mounted), is rigidly attached to a door, with the post assembly rotatably supported within the mounting assembly, and the post latching assembly is rigidly attached to the door frame. Alignment of the post assembly and the post latching assembly is such that, as the door is closed, the post engages and protrudes into the channel of the latching assembly. To effect the latching function of the present invention, the rows of notches of the post are, upon protrusion of the post into the latching assembly channel, aligned with the latch elements of the latching assembly. In the embodiments incorporating a lock assembly, the interface linkage between the lock assembly and the post functions such that the latching function of the post and post latching assembly can not be released except through operation of the key or combination of the lock assembly.

Whereas certain embodiments of the first embodiment of the present invention are depicted and discussed herein, the latching system of the first preferred embodiment of the present invention is also disclosed in and is understood to comprise all of the various embodiments, inventions, and improvements disclosed in U.S. Pat. No. 5,022,243, which is expressly incorporated herein by this reference, in its entirety.

Briefly described, the second preferred embodiment of the present invention includes a ball and collar door latch. The door latch of the second preferred embodiment of the present invention comprises a bar and collar gripping and release mechanism cooperatively mounted to the door and door frame of a vending machine or money box cabinet to provide the initial latching function in the form of a frictional gripping of the bar by the collar, and also comprises a lock assembly associated with the bar and collar mechanism to provide a primary locking function and to effect release of the latching function. In accordance with the second preferred embodiment of the present invention, the lock assembly is of a type typically known in the art and is connected by interface linkage to the bar so as to effect release of the latching function of the bar and collar mechanism.

The bar of the bar and collar mechanism is rigidly attached to one of the door elements (either the door or the door frame) and the collar portion is rigidly attached to the other of the door elements. Alignment of the bar and collar is such that, as the door is closed, the bar engages and protrudes into the axial passage of the collar's inner shell. To effect the latching function of the present invention (the ball-on-arc latching function) the arcuate surface of the bar is, upon protrusion of the bar into the collar passage, aligned with the balls of the collar. The interface linkage between the lock assembly and the bar and collar mechanism functions such that the latching function of the bar and collar can not be released except through operation of the lock assembly. In the preferred embodiments of the second preferred embodiment of the present invention, the lock assembly, through interaction of the interface linkage, releases the latching function of the bar and collar by one or both of the "axial-pull" release method or the "angular-twist" release method. Upon release of the latching function, the door of the vending machine (or money box cabinet) can be opened, since the bar will pull free of the collar.

The components and functions of the bar and collar mechanism are understood by reference to U.S. Pat. No. 4,900,182 which is expressly incorporated herein by this reference, in its entirety. For a better understanding of the frictional-grip, latching function (the ball-on-arc gripping function) and the related "axial-pull" releasing method, please refer to U.S. Pat. No. 4,900,182. Whereas certain embodiments of the second embodiment of the present invention are depicted and discussed herein, the latching system of the second preferred embodiment of the present invention is also disclosed in and is understood to comprise all of the various embodiments, inventions, and improvements disclosed in U.S. Pat. No. 5,197,314, which is expressly incorporated herein by this reference, in its entirety.

It is, therefore, an object of the present invention is to provide a latching system to assist in deterring vandals.

Another object of the present invention to provide a door latch which greatly hinders the efforts of vandals to break through the locked door latch.

Still another object of the present invention is to provide a vending apparatus, cabinet or the like which comprises a unique door latch to assist in deterring vandals.

Still another object of the present invention is to provide a latching system which is durable and capable of holding a door and door frame in a latched manner in the face of abusive treatment.

Still another object of the present invention is to provide a latching system which effects strong latching between latch components yet is quickly and easily unlatched.

Still another object of the present invention is to provide a door latch which effects a gripping action between latch components, whereby the gripping force increases as the door is pulled or pried without proper operation of the key or combination.

Still another object of the present invention is to provide an improved latching system which can be retrofit to existing framework.

Other objects, features and advantages of the present invention will become apparent upon reading and understanding the present specification and the patents incorporated herein by reference, when taken in conjunction with the appended drawings.

BRIEF DESCRIPTION OF THE DRAWINGS

FIG. 2A is an isolated, top view of a post assembly of the latching system of FIG. 1.

FIG. 2B is an end view of the isolated post assembly of FIG. 2A, seen from the right end of FIG. 2A.

FIG. 2C is an isolated, enlarged view of that top view of the portion of the post assembly as indicated by the circle of FIG. 2A.

FIG. 2D is a view of the isolated portion of the post assembly seen in FIG. 2C, seen from what would be the side view of FIG. 1 and the top of FIG. 2C.

FIG. 2E is an end view of the isolated post assembly of FIG. 2C, seen from the left end of FIG. 2C.

DETAILED DESCRIPTION OF THE INVENTION

Figure 1:
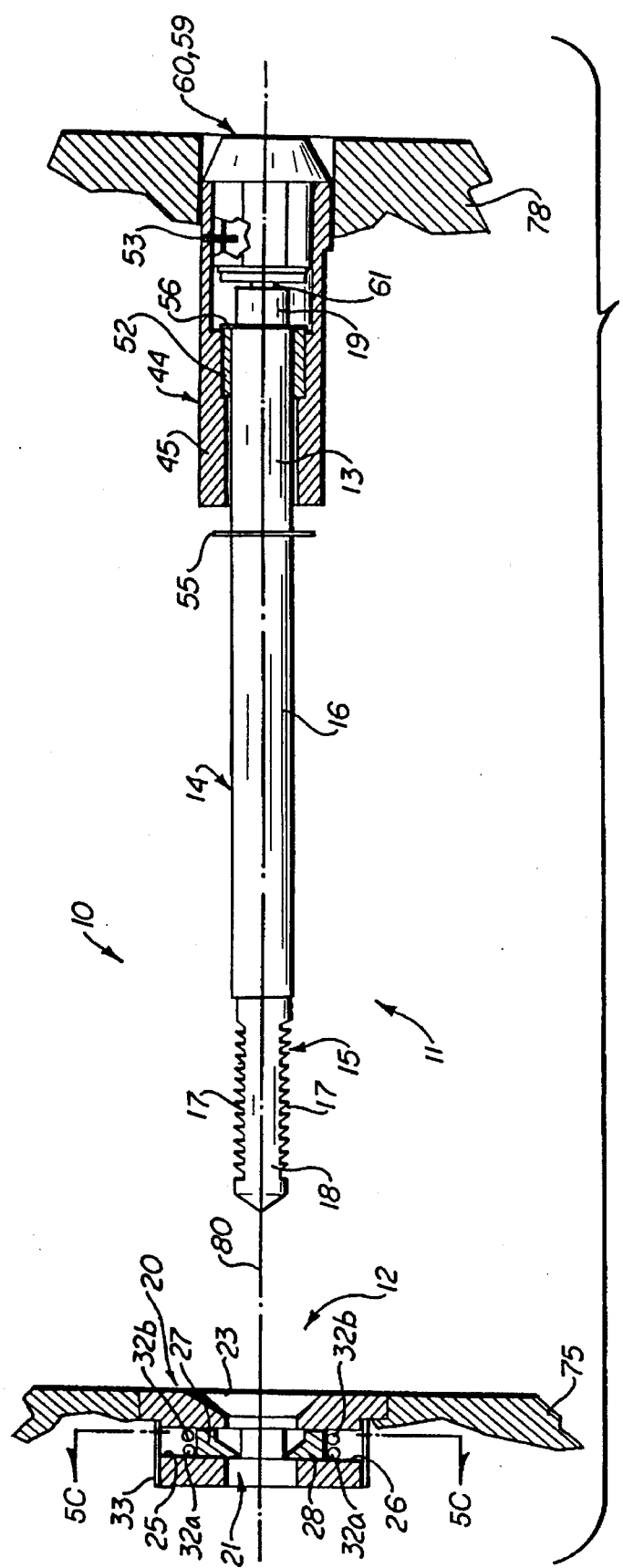
FIG. 1 is a side view of the improved latching system in accordance with the first preferred embodiment of the present invention, with parts cut away for clarity and with latching components unconnected and unsupported by closure pieces.

Referring now in greater detail to the drawings in which like numerals represent like components throughout the several views, a first preferred embodiment of the latching system 10 of the present invention is seen in FIG. 1 as comprising a post assembly 11, a post latching assembly 12, and a handle assembly 60. A mounting assembly 44 is, in the disclosed embodiment, associated with the post assembly 11 and the handle assembly 60. The post assembly 11 includes, generally, an elongated post 14. The post 14 of the preferred embodiment (with reference to FIGS. 1 and 2A–2E) is seen as including a mounting portion 13, a latching portion 15, a post extension portion 16 and a coupling portion 19. The mounting portion 13 is that portion by which the post 14 is mounted to the mounting assembly 44 (see FIG. 1). The mounting portion 13 is defined between two annular grooves 35, 36. The latching portion 15 is defined at the end of the post 14 opposite the mounting portion 13, and is that portion by which the post is "gripped" by the post latching assembly 12 to effect the primary latching function of the latching system 10. The latching portion 15 is formed as a "multi-surfaced" segment; that is, the surface of the latching portion alternates, about opposite quadrants of this post 14, between notched surfaces 17 and smooth surfaces 18. One embodiment of the latching portion 15 is seen in greatest detail in FIGS. 2C, 2D, 2E, and includes two notched surfaces 17 and two smooth surfaces 18. Each notched surface 17 of the illustrated embodiment includes a single row of arcuate teeth 38, which teeth each are formed with a rearwardly tapered leading surface 39 and a radially extending trailing surface 40. The row of teeth 38 of each notched surface 17 extends lengthwise along the latching portion 15 of the post 14. Each tooth 38 extends crosswise across the respective notched surface 17. The post 14 length is varied, depending on the application, by the length of the extension portion 16. The coupling portion 19 of the preferred embodiment is seen in FIGS. 2A and 2B as including a channel 42 formed along the diameter of the post 14.

Figure 3B:
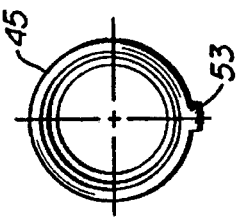
FIG. 3B is an end view of the isolated post housing assembly of FIG. 3A, seen from the right end of FIG. 3A.
Figure 3A:
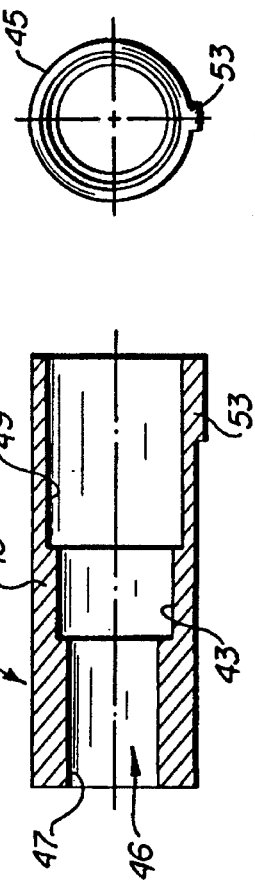
FIG. 3A is an isolated, cutaway side view of a post housing assembly of the latching system of FIG. 1.
Figure 4A:
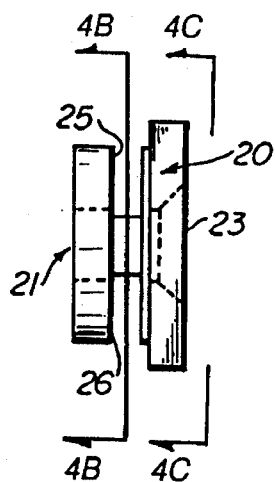
FIG. 4A is an isolated, side view of a latch housing of the latching system of FIG. 1, with certain component portions removed.
Figure 4B:
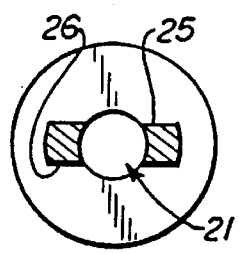
FIG. 4B is a view of the element of FIG. 4A, taken along line 4B—4B of FIG. 4A.
Figure 4C:
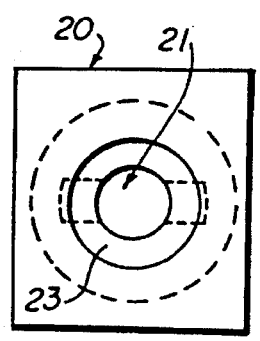
FIG. 4C is a view of the element of FIG. 4A, taken along line 4C—4C of FIG. 4A.

The mounting assembly 44, seen in a first, preferred embodiment in FIGS. 1, 3A and 3B, is comprised mainly of a support housing 45 and bearing assembly 52. The support housing 45 is generally cylindrical and is formed with an axial passage 46 of three chambers: the narrower, post support chamber 47 of first diameter; the bearing chamber 48 of second diameter; and the coupling chamber 49 of third diameter. A cylindrical bearing assembly 52 is press-fitted into the bearing chamber 48. The support housing 45 also includes an elongated rib 53 protruding from the housing cylinder. As is noted from FIG. 1, the post 14 is mounted at its mounting portion 13 within the support housing 45, rotatably supported by the bearings 52. An external locking ring 55 occupies the outer annular groove 35 of the post 14 and a spring bearing disc 56 occupies the inner annular groove 36. In the preferred embodiments, the external locking ring 55 functions, at least, to protect the post 14 from being pushed to far into the housing 45; and the spring bearing disc 56 functions, at least, to prevent the post from pulling out of the housing. Furthermore, the spring action of the spring bearing disc 56, preferably, functions to provide a degree of flexibility when mounting in various die cast lock assemblies.

The handle assembly 60 is mounted within the coupling chamber 49 of the mounting housing 44. (See FIG. 1.) The handle assembly 60 of this first, preferred embodiment of FIG. 1 includes a coupling shaft 61 which interfaces with the coupling channel 42 of the post coupling portion 19; whereby, as the coupling shaft rotates, so rotates the post 14. The handle assembly 60 also includes a mechanism, such as a grip handle or lock cylinder, for effecting rotation of the coupling shaft 61. In the embodiment of FIG. 1, the handle assembly 60 embodies a lock assembly 59 for providing selective control over rotation of the coupling shaft 61.

Figure 5A:
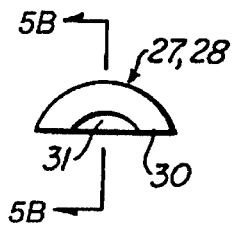
FIG. 5A is an isolated end view of a latch element of the post latching assembly of FIG. 1.
Figure 5B:
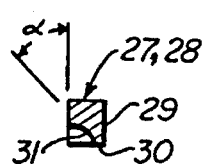
FIG. 5B is a side view of the latch element of FIG. 5A.
Figure 5C:
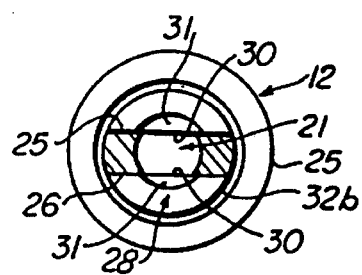
FIG. 5C is an isolated view of the post latching assembly of the latching system of FIG. 1, taken along line 5C—5C of FIG. 1.

The latching assembly 12 (refer to FIGS. 1 and 4A–4C) includes a latch housing 20 formed with an axial passage 21 for accepting the latching portion 15 of the post therein. The post entry end 23 of the axial passage 21 is flared as with a chamfer. The latch housing 20 of the preferred embodiment is also formed with two opposing radial slots 25, 26 which slots are cut deep enough into the housing 20 to breach the axial passage 21. As seen in FIG. 1, positioned within each of the radial slots 25, 26 is a latch element 27, 28. The latch elements 27, 28 (refer to FIGS. 5A and 5B) are formed as semicircular plates with their straight edges 30 inserted into the respective radial slot 25, 26 such that the straight edges protrude into the axial passage 21 of the housing 20. In the preferred embodiment, the straight edges 30 of the latch elements 27, 28 are tapered (in a semicircular region of taper 31) as seen in FIGS. 5A and 5B; and the latch elements are oriented within the slots 25, 26 with the taper 31 oriented relative to the post entry end 23 of the axial passage 21 as shown within FIG. 1. The latch elements 27, 28 are retained within the radial slots 25, 26 by an elastic member 32. In the preferred embodiment, the elastic member 32 is comprised of two O-rings 32a, 32b. The O-rings 32a, 32b, in their normally compressed mode, bias the latch elements 27, 28 to their most radially inward position with the straight edges 30 pressed against the inner surfaces of the radial slots 25, 26 (refer to FIG. 5C). The O-rings allow the latch elements 27, 28 to move temporarily, radially outward in response to an outward force at the straight edges 30; and the o-rings return the latch elements to their inward position when such force is removed. As seen in FIG. 1, a cylindrical, protective sleeve 33 removably covers the radial slots 25, 26.

To operate the primary latching function of the latching system 10, the post 14 is rotated to align the rows of teeth 38 of the post latching portion 15 with the latch elements 27, 28 of the post latching assembly 12. To release the primary latching function, the post 14 is rotated to move the rows of teeth 38 out of alignment with the latch elements 27, 28.

In the preferred embodiment, the post assembly 11 is mounted, as by the mounting assembly 44, to, for example, a door 78; and the post latching assembly 12 is mounted, as by the latch housing 20 to, for example, the related door frame 75. The post assembly 11 and latching assembly 12 are so aligned that, when the door 78 is closed, the post latching portion 15 engages and protrudes into the axial passage 21 of the latch housing 20. The lock assembly 59 is inserted into the coupling chamber 49 of the support housing 45 with the coupling shaft 61 interfacing the coupling portion 19 of the post 14. The lock assembly 59 is installed such that, when locked, the rows of teeth 38 on the post 14 are aligned with the latch elements 27, 28, as represented in FIG. 1. With the lock assembly 59 in the locked position, when the door 78 is closed, the rows of teeth 38 of the post 14 are, upon protrusion of the post latching portion 15 into the axial passage 21, engaged by the latch elements 27, 28. As the tapered leading surfaces 39 of the teeth 38 contact the tapered surfaces 31 of the latch elements 27, 28, the resultant force overcomes the elastic bias of the O-rings 32 and the latch elements move to allow entry of the post 14 into the latching assembly 12 until the door is completely closed.

If it is attempted to remove the post latching portion 15 from the axial passage 21, the radially extending trailing surfaces 40 of the teeth 38 will strike flatly against the radially extending, non-tapered surfaces 29 of the latching element straight edges 30. Thus the post 14 will not be removable. This is the primary latching function. The door 78 is now latched to the frame 75 and can only be opened by operating the lock assembly 59. When the lock assembly is operated, the coupling shaft 61 turns the post 14 to move the rows of teeth 38 out of alignment with the latch elements 27, 28 and move the smooth surfaces 18 into alignment with the latch elements. The door can now be opened as the post will move freely out of the latching assembly 12. Before the door 78 is again closed, the lock assembly 59 is returned to the locked configuration, where the rows of teeth 38 will again be aligned with the latch elements 27, 28.

Figure 6A:
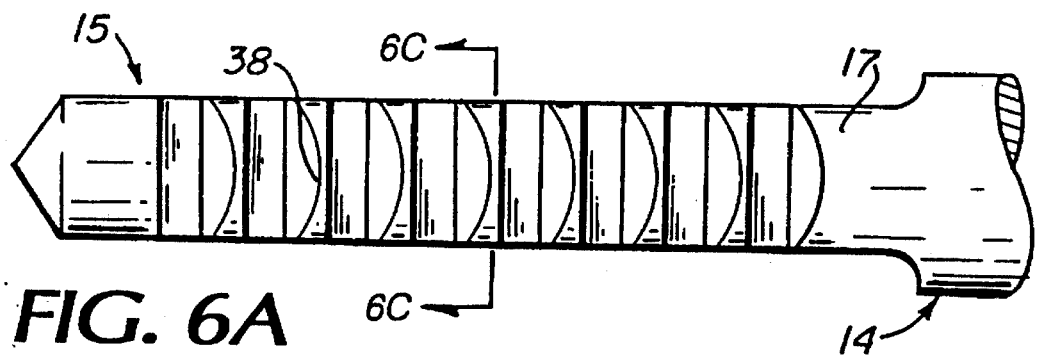
FIG. 6A is an isolated, enlarged view of that top view of the portion of the post assembly as indicated by the circle of FIG. 2A, but showing an alternate embodiment to that of FIG. 2C.
Figure 6B:
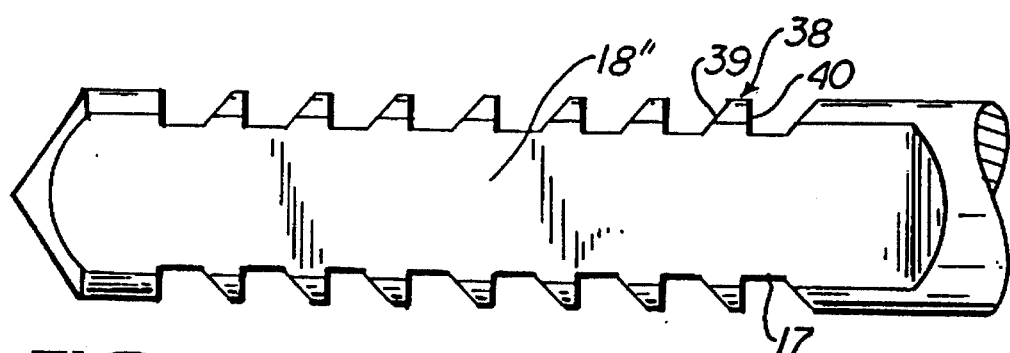
FIG. 6B is a view of the isolated portion of the post assembly seen in FIG. 6A, seen from what would be the side view of FIG. 1 and the top of FIG. 6A.
Figure 6C:
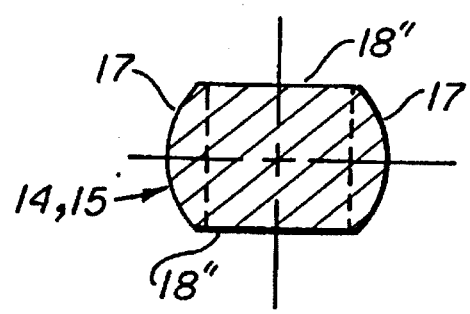
FIG. 6C is a view of the isolated post assembly of FIG. 6A, as seen along line 6C—6C of FIG. 6A.

Whereas, the preferred embodiment of the latching portion 15 of the post 14 is depicted in FIGS. 2C and 2E as including smooth surfaces 18 which are each curved surfaces (i.e. convex arcs in their end profile as seen especially in FIG. 2E), other alternate embodiments of the smooth surface 18 are contemplated within the broad scope of the invention. One such alternate embodiment is depicted in FIGS. 6A, 6B and 6C. In this alternate embodiment of FIG. 6, the smooth surfaces 18" are each flat surfaces (i.e. straight lines in their end profile formed from a plurality of radii from a central axis of the post 14 as seen in FIG. 6C).

Figure 7:
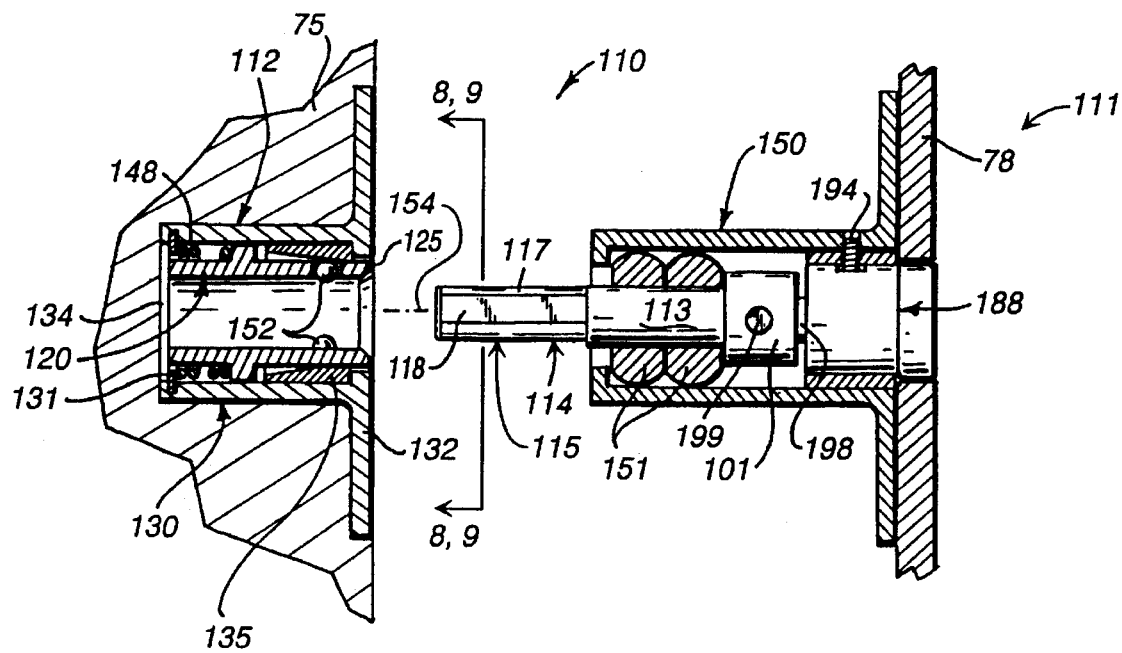
FIG. 7 is an isolated side view, with portions cut away, of a Door Latch, and related door components, in accordance with the second preferred embodiment of the present invention.

A door latch 111 of the second preferred embodiment of the present invention is seen in FIG. 7. The embodiment of FIG. 7 is uniquely constructed to utilize a lock assembly 188 to activate an angular-twist release function of a post and collar mechanism 110 by angular rotation of a post 114. Please refer to U.S. Pat. No. 4,900,182 for an explanation of the angular-twist release function, and Pat. No. 5,197,314 for additional information regarding post and collar 110 door latches 111. In this embodiment, a collar portion 112 is mounted to the door frame 75 and the post 114 is mounted to the door 78. An outer sleeve 130 of the collar portion 112 is seen with its back end 132 formed into a mounting plate 132 by which the sleeve, and thus the collar, is mounted to the door frame 75. This is by way of example only, and side mounting or mounting from the front end 134, as well as other appropriate mounting is acceptable. The outer sleeve 130 is provided with a flange 131 at its front end 134. It is seen that the collar portion 112 is oriented such that the back end 125 of inner shell 120 is facing the door 78 so as to accept the post 114 in the proper latching operation. The collar portion 112 further includes a biasing spring 148 and a tension ring 135. The post 114 of the embodiment of FIG. 7 is mounted to the door 78 within a housing 150, together with the lock assembly 188. The lock assembly 188 is mounted by one or more set screws or pins 194 in the manner described with respect to FIG. 1 of Pat. No. 5,197,314. A latching portion 115 of the post 114 protrudes from the housing 150 with a mounting portion 113 of the post supported by self-aligning bearings 151 within the housing. A shaft 198 is attached to the lock assembly 188, and a collar 101, which is rigidly attached to (for example, formed as part of) the post 14. The pin 199 connects the shaft 198 to the post collar 101 to effect rotation of the post 114 upon operation of the lock assembly 188. The latching portion 115 of the post 114 is seen in this embodiment as being multi-surfaced, similar to those embodiments described with respect to FIG. 1 of Pat. No. 5,197,314. Thus it is seen that the latching function of the embodiment of FIG. 7 is accomplished by arranging the locking assembly 188 so that first surfaces 117 of the post are aligned with balls 152 of the collar portion 112 when the lock assembly is in the lock position. When the door 78 is closed and the latch in effect, the latch is released by operating the lock assembly 188 to thus turn the post 114, until inner second surfaces 118 (of reduced radius "r") are aligned with the balls 152 of the collar portion 112. Thus, the angular-twist latch release is effected.

Figures 8, 9:
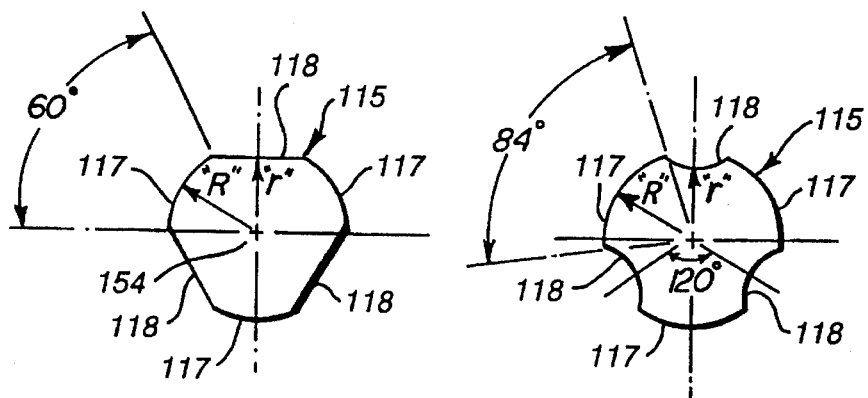
FIG. 8 is an isolated view of the post of FIG. 7, as if taken along line 8—8 of FIG. 7, and depicting one embodiment thereof.
FIG. 9 is an isolated view of the post of FIG. 7, as if taken along line 9—9 of FIG. 7, and depicting an alternate embodiment to that of FIG. 8.

The post 114 is seen in FIG. 7 as comprising, generally, two portions: the mounting portion 113 and the latch portion 115 by which the post is "gripped" by the collar 112 to effect the primary latching function. The latch portion 115 of this embodiment is seen as being "multi-surfaced". The term "multi-surfaced" is used to indicate that the surface of the latch portion 115 of the post 114 alternates, about the circumference of the post, from the first surface 117, defined at an outer radius ("R") from the post axis 154, to a second surface 118, defined at an inner radius ("r") from the post axis 54. With reference to FIGS. 8 and 9, two alternate configurations of the multi-surfaced latch portion 115 of the post are studied. FIG. 8 depicts an isolated end view (as if taken along line 8—8 of FIG. 7) of the multi-surfaced latch portion 115 of the embodiment disclosed in U.S. Pat. No. 4,900,182, and acceptable as one embodiment of the present invention, wherein the alternating surfaces are arcuate surfaces 117 and flat surfaces 118. The latch portion 115 of FIG. 9 depicts an isolated end view (as if taken along line 9—9 of FIG. 7) of an alternate embodiment of post 114, wherein the alternating surfaces are convex (arcuate) surfaces 117 and concave surfaces 118, defining, for example, a series of elongated ridges 117 and troughs 118. In each of the embodiments of FIGS. 8 and 9, and in other possible embodiments, the first surface 117 defines an outer radius "R" of sufficient distance to force frictional engagement of the balls 152 against the tension ring 135 during the ball-on-arc gripping function; and the second surface 118 defines a lessened radius so as to avoid frictional engagement between the balls 152 (when aligned with the point of inner radius "r") and the tension ring 135.

It is understood that the relative dimensions and relationships shown on the drawings are given as the preferred relative dimensions and relationships; but the scope of the invention is not to be limited thereby.

Whereas the present invention has been described in detail herein with specific reference to particular embodiments thereof, it will be understood that variations and modifications can be effected within the spirit and scope of the invention as described hereinbefore and as defined in the appended claims.

I claim:

1. A latching apparatus comprising:
   a post member defining,
   an elongated axis,
   an elongated, axially extending latching surface defined by at least one outer radius from said elongated axis, and
   an elongated, axially extending releasing surface defined by at least one inner radius from said elongated axis, wherein said outer radius is greater than said inner radius;
   a latching assembly defining a passage for receiving said post member and including a grip means extending at least partially into said passage for,
   effecting a grip between said post member and said latching assembly when said grip means cooperates with said latching surface, and
   releasing said grip between said post member and said latching assembly when said grip means cooperates with said releasing surface; and
   a moving means for,
   moving said latching surface into cooperation with said grip means, whereby said grip is effected between said post member and said latching assembly, and
   moving said releasing surface into cooperation with said grip means, whereby said grip is released between said post member and said latching assembly.

2. Apparatus of claim 1, wherein said latching surface defines a smooth surface.

3. Apparatus of claim 1, wherein said latching surface defines a notched surface.

4. Apparatus of claim 3, wherein said notched surface includes, at least, a plurality of teeth.

5. Apparatus of claim 1,
wherein said grip means includes, at least, a ball, and
wherein said latching assembly further includes,
an inner shell defining said passage and further defining a radial opening in said inner shell, wherein said ball is located in and radially movable within said radial opening,
an outer shell positioned outside said inner shell, wherein said inner shell is axially slidable in a first direction and a second direction with respect to said outer shell, said outer shell including, at least, a tapered portion defining a tapered inner surface adjacent to said ball, and
a biasing means for biasing said inner shell axially in said first direction such that said ball is biased into engagement with said tapered inner surface, whereby said ball is biasly urged radially inwardly into said passage, wherein said biasing means accommodates movement of said inner shell in said second direction to accommodate radial movement of said ball out of said passage.

6. Apparatus of claim 3,
wherein said grip means includes, at least, a latching element, and
wherein said latching assembly further includes, at least,
a housing member including, at least, an entry element defining said passage for receiving said post member, wherein said passage defines a central entry axis, and
a biasing means extending from said latching element in a direction having a directional component toward an opposite side of said passageway for biasing said latching element toward said central entry axis, and
wherein said latching element is movable between an outward orientation and an inward orientation nearer said central entry axis.

7. Apparatus of claim 6, wherein said latching assembly further includes, at least, an inward positioning means for maintaining a predetermined distance between said latching element and said central entry axis during said inward orientation.

8. Apparatus of claim 1, wherein said latching surface defines an axially continuous arcuate surface defined by one radius from said elongated axis.

9. Apparatus of claim 2, wherein said releasing surface is defined by a plurality of radii and further defines, in profile, a straight line.

10. Latching apparatus comprising:
a post member defining a central post axis and including, at least, a grip portion defining a maximum grip portion radius and a release portion defining a maximum release portion radius, wherein said maximum grip portion radius is greater than said maximum release portion radius;
an engagement means for engaging said grip portion of said post member to prevent axial movement of said post member in a first axial direction when said post member is oriented in a first angular orientation relative to said engagement means, and for cooperating with said release portion of said post member to allow axial movement of said post member in said first axial direction when said post member is oriented in a second angular orientation relative to said engagement means; and
a releasing means for effecting relative axial rotation between said post member and said engagement means.

11. Apparatus of claim 10, wherein said grip portion and said release portion extend axially along said post member.

12. Apparatus of claim 10, wherein all points on said release portion are located at only one radial distance from said central post axis.

13. Apparatus of claim 10, wherein said release portion defines a plurality of release surface points located at more than one radial distance from said central post axis.

14. Apparatus of claim 13, wherein said release portion defines, in profile, a straight line.

15. Apparatus of claim 10, wherein all points on said grip portion are located at only one radial distance from said central post axis.

16. Apparatus of claim 10, wherein said grip portion defines a plurality of release surface points located at more than one radial distance from said central post axis.

17. Apparatus of claim 16, wherein said grip portion includes, at least, a notched portion.

18. Apparatus of claim 10, wherein said releasing means is connected to said post member and includes, at least, a T-handle with a key-operated cylinder lock.

19. Apparatus of claim 10, wherein said releasing means includes, at least, a lock assembly abutting an end of said post member.

20. Apparatus of claim 10, wherein said engagement means includes at least one movable latch element and a biasing means for biasing said movable latch toward said post member.

21. Apparatus of claim 20, wherein said biasing means includes, at least, an elastic circular member, and wherein said latch element includes at least one planar surface.

22. Apparatus of claim 10, wherein said engagement means includes, at least,
a housing member defining a passageway having a central axis for receiving said post member,
a latching element movable between an outward position and an inward position nearer said central axis, and
a biasing means for biasing said latching element toward said central axis of said passageway.

23. Apparatus of claim 22, wherein said latching element defines a first latching element, and wherein said engagement means further includes, at least, a second latching element, and wherein said biasing means contacts both said first latching element and said second latching element.

24. Apparatus of claim 22, wherein said latching element is located on one side of said passageway, and wherein said biasing means extends around to an opposite side of said passageway.

25. Apparatus of claim 24, wherein said latching element is spherical, and wherein said biasing means includes, at least,
an inner cylindrical member defining an aperture for retaining said latching element,
an inclined member rigidly connected to said housing member at a position located between said inner cylindrical member and said housing member, and
a spring means for axially biasing said inner cylindrical member with respect to said housing member.

26. Apparatus of claim 10, wherein said engagement means is engaged to said release portion of said post member when said post member is oriented in said second angular orientation.

27. Latching apparatus for releasably latching a first door element, such as a vending machine door, and a second door element, such as a vending machine frame, said apparatus comprising:

a post member defining, at least, a multi-surfaced latching portion, which latching portion includes at least one axially extending notched surface and at least one axially extending smooth surface disposed about the circumference of said post member, wherein said smooth surface defines, in profile, a surface at a plurality of radii from a central axis of said post member;

a latching assembly comprising a passage for accepting said latching portion of said post member therein, and a latch means for effecting a grip on said notched surface when said latching portion of said post member is within said passage, thus resisting removal of said latching portion of said post member from said passage of said latching assembly; and a releasing means for releasing said grip between said notched surface and said latch means, thus facilitating removal of said latching portion of said post member from said passage of said latching assembly.

28. Apparatus of claim 27, wherein said smooth surface further defines a flat surface which defines, in profile, a straight line.

29. Latching apparatus comprising:

a post member defining a central post axis and including, at least, a grip portion defined by a plurality of grip portion surface points, wherein said plurality of grip portion surface points includes at least one outer grip portion surface point which is located at a first radial distance from said central post axis and is radially displaced from said central post axis at least as far as every other grip portion surface point of said plurality of grip portion surface points, and a release portion angularly disposed around said post member from said grip portion defined by a plurality of release portion surface points, wherein said plurality of release portion surface points includes at least one outer release portion surface point which is located at a second radial distance from said central post axis and is radially displaced from said central post axis at least as far as every other release portion surface point of said plurality of release portion surface points, wherein said first radial distance is greater than said second radial distance;

an engagement means for engaging said grip portion of said post member to prevent axial movement of said post member in a first axial direction when said post member is in a first angular orientation relative to said engagement means, and for cooperating with said release portion of said post member to allow axial movement of said post member in said first axial direction when said post member is in a second angular orientation relative to said engagement means; and a releasing means for effecting relative axial rotation between said post member and said engagement means.

30. Apparatus of claim 29, wherein said releasing means includes means for rotating said post member.

31. Apparatus of claim 29, wherein said grip portion and said release portion extend axially along said post member.

32. Apparatus of claim 29, wherein said grip portion includes a plurality of notches and wherein said release portion is smooth.

33. Apparatus of claim 32, wherein each notch of said plurality of notches comprises a radial surface defining a plane parallel to a radial plane of said post member and an inclined surface defining a plane at an acute angle to said radial plane of said post member.

34. Apparatus of claim 29, wherein said plurality of release surface points are located at a plurality of radial distances from said central post axis.

35. Apparatus of claim 34, wherein said release portion defines, in profile, a straight line.

36. Apparatus of claim 29, wherein said plurality of grip surface points are located at one radial distance from said central post axis.

37. Apparatus of claim 29, wherein said releasing means includes, at least, a T-handle.

38. Apparatus of claim 29, wherein said releasing means is removably connected to said post member as an axial extension of said post member.

39. Apparatus of claim 29, wherein said releasing means includes, at least, a lock assembly abutting an end of said post member.

40. Apparatus of claim 29, wherein said engagement means includes, at least, a housing member defining a passageway with a central axis for receiving said post member, a latching element located within said housing member and movable between an outward position and an inward position nearer said central axis, and a biasing means for biasing said latching element toward said central axis of, said passageway.

41. Apparatus of claim 40, wherein said biasing means includes, at least, an elastic circular member.

42. Apparatus of claim 40, wherein said latching element defines a first latching element, and wherein said engagement means further includes, at least, a second latching element, and wherein said biasing means contacts both said first latching element and said second latching element.

43. Apparatus of claim 40, wherein said latching element is located on one side of said passageway, and wherein said biasing means extends around to an opposite side of said passageway.

44. Apparatus of claim 40, wherein said biasing means includes, at least, means for constricting around said passageway.

45. Apparatus of claim 40, wherein said latching element defines a first latching element, wherein said engagement means further includes, at least, a second latching element, and wherein said housing member includes, at least, separation means for maintaining separation between said first latching element and said second latching element.

46. Apparatus of claim 40, wherein said latching element is spherical, and wherein said biasing means includes, at least, an inner cylindrical member defining an aperture for retaining said latching element, an inclined member rigidly connected to said housing member at a position located between said inner cylindrical member and said housing member, and a spring means for axially biasing said inner cylindrical member with respect to said housing member.

47. Apparatus of claim 29, wherein said engagement means is engaged to said release portion of said post member when said post member is oriented in said second angular orientation.

48. A latching apparatus comprising:

a post member defining a central post axis and including, at least, a grip portion defining a maximum grip portion radius and a release portion defining a maximum release portion radius, wherein said maximum grip portion radius is greater than said maximum release portion radius;

a movable latch element selectively contacting said grip portion of said post member; and a rotation extension connected to said post member.

49. The latching apparatus of claim 48, further comprising a frame member defining a passageway having a central axis, wherein said latch element is connected to said frame member and said post member is insertable into and axially rotatable within said passageway.

50. The latching apparatus of claim 49, wherein said latch element is movable between an outward position and an inward position nearer said central axis, and said latch element is biased toward said inward position, wherein said latching element engages said grip portion of said post member to prevent axial movement of said post member in a first axial direction when said post member is oriented within said passageway and in a first angular orientation relative to said latching element, and wherein said latching element cooperates with said release portion of said post member to allow axial movement of said post member in said first axial direction when said post member is within said passageway and oriented in a second angular orientation relative to said latching element.

51. The latching apparatus of claim 50, wherein said grip portion and said release portion extend axially along said post member.

52. The latching apparatus of claim 50, wherein said latch element engages said release portion of said post member when said post member is oriented in said second angular orientation relative to said latching element.

53. The latching apparatus of claim 50, wherein said grip portion of said post member includes, at least, a radially extending protrusion that abuts said latching element when said post member is oriented within said passageway and in said first angular orientation relative to said latching element.

54. The latching apparatus of claim 50, wherein said grip portion and said release portion extend axially along said post member.

55. A gripping apparatus for receiving and releasably gripping a post member, the gripping apparatus comprising:

a frame member defining a passageway with a central axis for receiving the post member;

a plurality of latch elements movably connected to said frame member to be movable within a common plate between an outward position and an inward position nearer said central axis, and a unitary bias member associated with at least two latch elements of said plurality of latch elements.

56. The gripping apparatus of claim 55, wherein said unitary bias member is connected to at least two latch elements of said plurality of latch elements.

57. The gripping apparatus of claim 55, wherein said unitary bias member biases each latch element of said plurality of latch elements toward said inward position.

58. The gripping apparatus of claim 55, wherein said plurality of latch elements includes, a least, a first latch element and a second latch element diametrically opposed to said first latch element.

59. The gripping apparatus of claim 58, wherein said first latch element defines a first direction of travel and said second latch element defines a second direction of travel that is collinear with said first direction of travel.

60. The gripping apparatus of claim 55, wherein said plurality of latch elements includes, a least, a first latch element defining a first direction of travel having a first radial component, and a second latch element defining a second direction of travel having a second radial component, wherein said first radial component and said second radial component are collinear.

61. The gripping apparatus of claim 60, wherein said unitary bias member biases each latch element of said plurality of latch elements toward said inward position.

62. A latching apparatus comprising:

a post member defining a central post axis;

a latch frame defining a passageway having a central axis for receiving said post member and allowing said post member to rotate therein; and a latch element movably connected to said latch frame to be movable between an outward position and an inward position nearer said central axis to, while occupying said inward position, allow removal of said post member during a first angular orientation of said post member and, while also occupying said inward postion, restrict removal of said post member during a second angular orientation of said post member.

63. The latching apparatus of claim 62, wherein said latch element is biased toward said inward position to allow removal of said post member during said first angular orientation of said post member and restrict removal of said post member during said second angular orientation of said post member.

64. The latching apparatus of claim 62, wherein said post member further defines an axially extending grip portion and an axially extending release portion, wherein said latch element engages said grip portion to prevent axial movement of said post member in a first axial direction when said post member is oriented within said passageway and is oriented in said second angular orientation relative to said latch frame, and wherein said latch element cooperates with said release portion to allow movement of said post member in said first axial direction when said post member is oriented within said passageway and is oriented in said first angular orientation relative to said latch frame.

65. The latching apparatus of claim 64, wherein said grip portion defines a maximum grip portion radius and said release portion defines a maximum release portion radius, wherein said maximum grip portion radius is greater than said maximum release portion radius.

66. The latching apparatus of claim 62, wherein said latch element includes at least one planar surface.

67. The latching apparatus of claim 62, wherein said latch element is biased toward said inward position.

68. The latching apparatus of claim 62, wherein said latch element is a first latch element, wherein the latching apparatus further comprises a second latch element movably connected to said latch frame to be movable between an outward position and an inward position nearer said central axis, wherein said first latch element and said second latch element are movable within a common plane.

69. The latching apparatus of claim 68, further comprising a unitary bias member that biases said first latch element and said second latch element toward said inward position.

70. The latching apparatus of claim 68, wherein said first latch is distal from said second latch element.

71. A latching apparatus for releasably latching a first door element, such as a vending machine door, and a second door element, such as a vending machine frame, the latching apparatus comprising:

a post member for attachment to the first door element and defining,
an elongated axis,
a pair of grip surfaces that are diametrically opposed and axially extending, wherein each grip surface of said pair of grip surfaces includes, at least, protrusions extending outward therefrom, and
a pair of release surfaces that are diametrically opposed and axially extending, wherein each release surface of said pair of release surfaces defines, in profile, a flat surface; and a latch assembly for attachment to the second door element and including, at least,
a frame member defining a passageway having a central axis, wherein said post member is insertable into and rotatable within said passageway, and
a pair of latch elements that are diametrically opposed, wherein each latch element of said pair of latch elements is movably connected to said frame member, movable between an outward position and an inward position nearer said central axis, and biased toward said inward position,
wherein said pair of latch elements engage said pair of grip surfaces to prevent axial movement of said post member in a first axial direction when said post member is oriented within said passageway and in a first angular orientation relative to said frame member, and
wherein said pair of latch elements cooperate with said pair of release surfaces to allow axial movement of said post member in said first axial direction when said post member is within said passageway and oriented in a second angular orientation relative to said frame member.

72. The latching apparatus of claim 71,
wherein each protrusion of said protrusions extending outward from said pair of grip surfaces comprises a ridge, whereby each grip surface of said pair of grip surfaces includes, at least, a plurality of ridges,
wherein said plurality of ridges at least partially surround said elongated axis of said post member, and
wherein said pair of latch elements engage ridges of said plurality of ridges to prevent axial movement of said post member in said first axial direction when said post member is oriented within said passageway and in said first angular orientation relative to said frame member.

73. The latching apparatus of claim 71,
wherein each grip surface of said pair of grip surfaces is defined by at least one outer radius from said elongated axis, and
wherein each release surface of said pair of release surfaces is defined by at least one inner radius from said elongated axis, wherein said outer radius is greater than said inner radius.

74. The latching apparatus of claim 71,
wherein said post member includes, at least, a first end and a second end,
wherein said first end of said post member defines said pair of grip surfaces and said pair of release surfaces, and
wherein the latching apparatus further comprises a T-handle with a key-operated cylinder lock connected to said second end of said post member.

75. A method of latching a first body to a second body, the method comprising the steps of:

connecting a post member to the first body, wherein the post member defines a central post axis and includes, at least, a grip portion defining a maximum grip portion radius and a release portion defining a maximum release portion radius, wherein the maximum grip portion radius is greater than the maximum release portion radius;

movably connecting a latch element to the second body;

effecting a grip between the latch element and the post member by, at least,
effecting a first angular orientation between the post member and the latch element, and
moving the first latch element into engagement with the grip portion of the post member so that a grip is effected between the latch element and the post member; and effecting a second angular orientation between the post member and the latch element so that the latch element cooperates with the release portion of the post member to release the grip between the post member and the latch element.

76. The method of claim 75, wherein the step of moving the first latch element includes, at least, allowing the latch element to move under the force of a biasing member.

77. The method of claim 75, wherein the steps of effecting a first angular orientation and effecting a second angular orientation each include, at least, rotating the post member angularly about the central post axis.

78. The method of claim 75,
wherein the step of effecting a grip further includes, at least, moving the post member into engagement with the latch element such that the latch element is moved to an outward position by overcoming the force of a biasing member, and
wherein the step of moving the latch element into engagement with the grip portion includes, at least, allowing the latch element to move to an inward position under the force of the biasing member, wherein the inward position is nearer to the central post axis than the outward position.

79. The method of claim 75,
wherein the method further comprises the step of movably connecting a second latch element to the second body, and
wherein the step of effecting a grip further includes, at least,
interposing the post member between the first latch element and the second latch element, and
moving the second latch element into engagement with the post member.

80. The method of claim 79, wherein the first latch element and the second latch element move in a common plane.

81. An engagement apparatus for being connected to a first element for receiving and releasably gripping a post member connected to a second element to form a connection between the first element and the second element, said engagement apparatus comprising:

an entry element defining a passageway with a central axis for receiving a post member;

a latching element movable between an outward position and an inward position nearer said central axis;

a biasing means extending from said latching element in a direction having a directional component toward an opposite side of said passageway for biasing said latching element toward said inward position, wherein said biasing means includes, at least, an elastic circular means for radially biasing said latching element toward said central axis; and a mounting means for connecting said engagement apparatus to the first element.

82. An engagement apparatus for being connected to a first element for receiving and releasably gripping a post member connected to a second element to form a connection between the first element and the second element, said engagement apparatus comprising:

an entry element defining a passageway with a central axis for receiving a post member;

a latching element movable between an outward position and an inward position nearer said central axis, wherein said latching element includes, at least, a planar engagement surface;

a biasing means extending from said latching element in a direction having a directional component toward an opposite side of said passageway for biasing said latching element toward said inward position; and a mounting means for connecting said engagement apparatus to the first element.

83. An engagement apparatus for being connected to a first element for receiving and releasably gripping a post member connected to a second element to form a connection between the first element and the second element, said engagement apparatus comprising:

an entry element defining a passageway with a central axis for receiving a post member;

a first latching element movable between an outward position and an inward position nearer said central axis;

a second latching element movable between an outward position and an inward position nearer said central axis;

a biasing means extending from said first latching element in a direction having a directional component toward an opposite side of said passageway for biasing said latching element toward said inward position; and a mounting means for connecting said engagement apparatus to the first element.

84. Apparatus of claim 83, wherein said biasing means includes, at least, a unitary member contacting both said first latching element and said second latching element.

85. Apparatus of claim 83, wherein said biasing means includes, at least, means for constricting around both said first latching element and said second latching element to bias said first latching element and said second latching element toward said central axis.

86. An engagement apparatus for being connected to a first element for receiving and releasably gripping a post member connected to a second element to form a connection between the first element and the second element, said engagement apparatus comprising:

an entry element defining a passageway with a central axis for receiving a post member;

a spherical latching element movable between an outward position and an inward position nearer said central axis;

a biasing means extending from said latching element in a direction having a directional component toward an opposite side of said passageway for biasing said latching element toward said inward position, wherein said biasing means includes, at least,
an inner cylindrical member defining an aperture for retaining said latching element,
an inclined member rigidly connected to said entry element at a position located between said inner cylindrical member and said entry element, and
a spring means for axially biasing said inner cylindrical member with respect to said entry element; and a mounting means for connecting said engagement apparatus to the first element.

* * * * *

UNITED STATES PATENT AND TRADEMARK OFFICE
CERTIFICATE OF CORRECTION

PATENT NO. : 5,467,619
DATED : November 21, 1995
INVENTOR(S) : Woodrow C. Stillwagon; Donald Embry It is certified that error appears in the above-identified patent and that said Letters Patent is hereby corrected as shown below:

[56] Title page, item
Add the following non-U.S. patents and U.S. periodicals:

FOREIGN PATENT DOCUMENTS:
```
196,185    2/1958   Austria         27/115L
2,633,669  2/1977   Germany         70/386
414,816    9/1934   Great Britain
1,121,898  7/1968   Great Britain
```

OTHER PUBLICATIONS:
Quick Acting Fastners For Removable Panels, Covers; and Sub-Assemblies - DZUS Fastner Co., Inc. - See area bordered by stars (* *)

Caulking Gun Sketches and Explanation

[*] Title page, before item [21],
Change this section to read as follows:

Notice: The portion of the term of this patent subsequent to February 13, 2007, has been disclaimed.

Signed and Sealed this

Twelfth Day of March, 1996

*Attest:*

BRUCE LEHMAN

*Attesting Officer*    *Commissioner of Patents and Trademarks*

(12) EX PARTE REEXAMINATION CERTIFICATE (5776th)
United States Patent
Stillwagon et al.

(10) Number: US 5,467,619 C1
(45) Certificate Issued: *Jun. 12, 2007

(54) POST LATCHING SYSTEMS

(75) Inventors: Woodrow C. Stillwagon, Atlanta, GA (US); Donald Embry, Cloverport, KY (US)

(73) Assignee: Stillwagon Applied Technology, Inc., Atlanta, GA (US)

Reexamination Request:
No. 90/007,186, Aug. 26, 2004
No. 90/007,135, Oct. 18, 2004

Reexamination Certificate for:
Patent No.: 5,467,619
Issued: Nov. 21, 1995
Appl. No.: 08/106,436
Filed: Aug. 13, 1993

(*) Notice: This patent is subject to a terminal disclaimer.

Certificate of Correction issued Mar. 12, 1996.

Related U.S. Application Data

(63) Continuation-in-part of application No. 07/834,248, filed on Feb. 13, 1992, now abandoned, which is a continuation-in-part of application No. 07/403,665, filed on Sep. 6, 1989, now Pat. No. 5,022,243, said application No. 08/106,436, filed on Aug. 13, 1993, is a continuation-in-part of application No. 08/011,196, filed on Jan. 29, 1993, now abandoned, which is a continuation of application No. 07/698,917, filed on May 13, 1991, now Pat. No. 5,197,314, which is a continuation of application No. 07/557,305, filed on Jul. 23, 1990, now Pat. No. 5,050,413, which is a continuation of application No. 07/358,888, filed on May 30, 1989, now Pat. No. 5,027,630, which is a continuation-in-part of application No. 07/327,250, filed on Mar. 22, 1989, now Pat. No. 4,900,182.

(51) Int. Cl.
*E05B 67/36* (2006.01)

(52) U.S. Cl. .............................. 70/34; 70/208; 70/386; 292/58; 403/325

(58) Field of Classification Search ................ None
See application file for complete search history.

(56) References Cited

U.S. PATENT DOCUMENTS

| | | | |
|---|---|---|---|
| 368,595 A | 8/1887 | King |
| 538,666 A | 5/1895 | Dixon |
| 545,215 A | 8/1895 | Torrey |
| 554,701 A | 2/1896 | Krupp |
| 1,262,435 A | 4/1918 | Berg |
| 1,274,381 A | 8/1918 | Brooks |

(Continued)

OTHER PUBLICATIONS

Compliant in Star Lock Systems, Inc. v. Dixie–Narco et al.
Certified copy of Abandoned U.S. Appl. No. 07/834,248.
Certified copy of U.S. Appl. No. 08/106,436.

(Continued)

*Primary Examiner*—Peter C. English

(57) ABSTRACT

A latching system, in accordance with a first preferred, embodiment of the present invention, comprises a notched post assembly, a post gripping assembly and a handle assembly, and, in preferred embodiments, a lock assembly associated with the handle assembly. The notched post assembly is comprised of an elongated post formed at one end with at least two opposing, axially extending rows of notches or teeth and alternately disposed smooth surfaces. The post gripping assembly comprises a channel for accepting the notched end of the post and comprises movable latch elements which cooperate with the notches of the post to effect the primary latching function of the system. The unlatching of the post from the channel is accomplished by rotating the post to disengage the notches and the latch elements. A latch, in accordance with a second preferred embodiment of the present invention, comprises a post and collar gripping and release mechanism cooperatively mounted to the door and door frame of a vending machine, cabinet, or the like, to provide an initial latching function in the form of a frictional gripping of the post by the collar, and further comprises a lock assembly associated with the post and collar mechanism to provide a primary locking function and to effect release of the latching function.

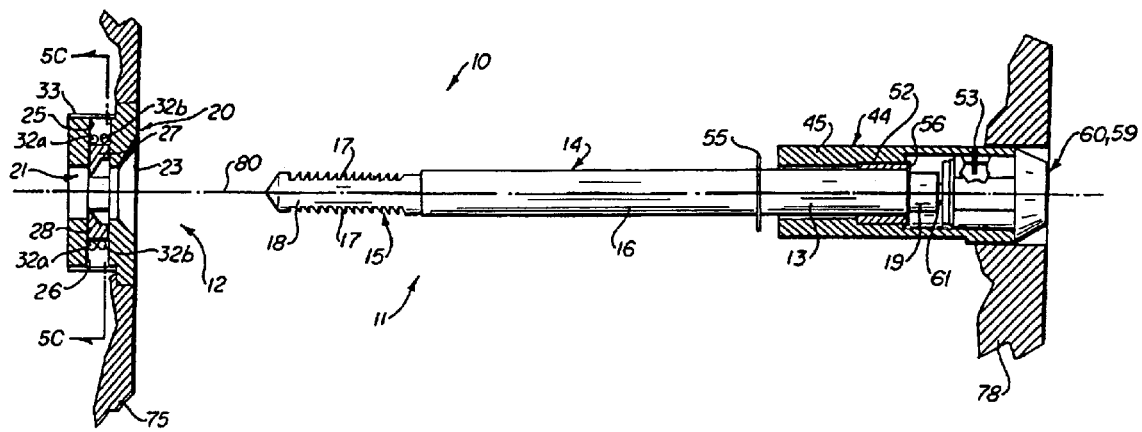

U.S. PATENT DOCUMENTS

| | | |
|---|---|---|
| 1,284,581 A | 11/1918 | Bullock |
| 1,836,970 A | 12/1931 | Hiering |
| 1,875,768 A | 9/1932 | Smith |
| 1,907,625 A | 5/1933 | Vogt |
| 2,118,729 A | 5/1938 | Hogan |
| 2,269,264 A | 1/1942 | Haim |
| 2,396,142 A | 3/1946 | Allen |
| 2,454,223 A | 11/1948 | Shippee |
| 2,486,003 A | 10/1949 | Christensen |
| 2,552,066 A | 5/1951 | Sorensen |
| 2,576,579 A | 11/1951 | Donovan |
| 2,727,772 A | 12/1955 | Hamilton |
| 2,741,503 A | 4/1956 | Thompson |
| 2,814,324 A | 11/1957 | Shur |
| 2,961,265 A | 11/1960 | Jakeman |
| 2,995,969 A | 8/1961 | Kraus |
| 3,026,702 A | 3/1962 | Cary |
| 3,039,802 A | 6/1962 | Barry |
| 3,080,633 A | 3/1963 | Reddy |
| 3,081,078 A | 3/1963 | Lohr |
| 3,133,168 A | 5/1964 | Jacobson |
| 3,152,822 A | 10/1964 | Griffiths |
| 3,253,310 A | 5/1966 | McCarthy |
| 3,397,000 A | 8/1968 | Nakanishi |
| 3,402,958 A | 9/1968 | Barry |
| 3,470,524 A | 9/1969 | Culver |
| 3,594,876 A | 7/1971 | Gunther |
| 3,673,913 A | 7/1972 | Barry |
| 3,695,139 A * | 10/1972 | Howe ......................... 411/432 |
| 3,718,950 A | 3/1973 | Engstrom |
| 3,753,316 A | 8/1973 | Savarieau |
| 3,798,935 A | 3/1974 | Blekking et al. |
| 3,919,869 A | 11/1975 | Fromm |
| 4,047,266 A | 9/1977 | Bisbing |
| 4,070,048 A | 1/1978 | Young |
| 4,159,138 A | 6/1979 | Smith |
| 4,174,008 A * | 11/1979 | Preziosi et al. ............. 411/353 |
| 4,213,230 A | 7/1980 | Hoen |
| 4,296,930 A | 10/1981 | Frederiksen |
| 4,377,359 A | 3/1983 | Peterson |
| 4,438,962 A | 3/1984 | Soloviff et al. |
| 4,552,001 A | 11/1985 | Roop |
| 4,556,244 A | 12/1985 | Bisbing |
| 4,580,322 A | 4/1986 | Wright et al. |
| 4,583,775 A | 4/1986 | Bisbing |
| 4,597,599 A | 7/1986 | Bisbing |
| 4,619,569 A | 10/1986 | Wright |
| 4,637,234 A * | 1/1987 | Mielonen ........................ 70/34 |
| 4,643,472 A | 2/1987 | Schukei et al. |
| 4,671,547 A | 6/1987 | Weinerman et al. |
| 4,679,835 A | 7/1987 | Weinerman et al. |
| 4,744,392 A | 5/1988 | Tade, III et al. |
| 4,781,507 A | 11/1988 | Duenas |
| 4,796,930 A | 1/1989 | Baynes ......................... 292/58 |
| 4,805,947 A | 2/1989 | Farris |
| 4,838,055 A | 6/1989 | Gallagher |
| 4,842,313 A | 6/1989 | Boyko et al. |
| 4,844,518 A | 7/1989 | Pritchard |
| 4,893,810 A * | 1/1990 | Lee ............................. 482/107 |
| 4,937,560 A | 6/1990 | Nourmand |
| 4,974,888 A * | 12/1990 | Childers ..................... 292/251 |
| 5,022,243 A * | 6/1991 | Embry et al. ................... 70/34 |
| 5,106,251 A | 4/1992 | Steinbach |
| 5,269,161 A * | 12/1993 | Stillwagon .................... 70/34 |
| 5,464,301 A | 11/1995 | Kramer |

OTHER PUBLICATIONS

Group of Tables Comparing The Disclosure of Sorensen.

Group of Tables Comparing the Disclosure of Reddy.

Group of Tables Comparing The Disclosure of Engstrom.

Group of Tables Comparing The Disclosure of Smith.

Group of Tables Comparing The Disclosure of Hoen.

First Amended Answer and Counterclaims of TriTeq Lock and Security, L.L.C.

Reply of Plaintiff Star Lock Systems, Inc. to First Amended Counterclaims of Defendant TriTeq Lock and Security, LLC.

Catalog Page from Chicago Lock with fax notated date Apr. 25, 1994 (Production No. SL 3805).

Catalog Page from Chicago Lock with hand notated date Mar. 21, 1996 (Production No. SL 3806).

Title Page of U.S. Patent No. 5,106,251 with fax notated date Jun. 6, 1996 and hand notes (Production No. SL 3988).

Letter from Louis T. Isaf to Dale N. Padjen dated Feb. 29, 1996 (Production No. 3292).

Letter from Dale N. Padjen to Louis T. Isaf dated Mar. 25, 1996 (Production No. 3293).

Letter from Louis T. Isaf to Dale N. Padjen dated Apr. 5, 1996 (Production No. 3294).

Letter from Basil E. Demeur to Louis T. Isaf dated May 29, 1996 (Production Nos. 3295–96).

Catalog Page from Chicago Lock with hand notes dated May 22, 1995 (Production Nos. 3783).

Publication of PCT Patent Application PCT/US90/04947.

Star Lock's Second Supplemental Response To TriTeq—s First And Second Sets Of Interrogatories—Interrogatory Response No. 4, Copy of Patentee's Response to Interrogatory Requests in *Star Lock Systems Inc.* v. *Dixie–Narco et al.*

Claim Chart Comparison of Claim 27 of the '619 Patent and Patentee's Admissions and U.S. Patent No. 5,106,251.

Claim Chart Comparison of Claim 28 of the '619 Patent and Patentee's Admissions and U.S. Patent No. 5,106,251.

Star Lock's First Supplemental Response To TriTeq's First And Second Sets Of Interrogatories—Interrogatory Response No. 2, Copy of Patentee's Response to Interrogatory Requests in *Star Lock Systems Inc.* v. *Dixie–Narco et al.*

Claim Chart Comparison of Claim 27 of the '619 Patent and Patentee's Admissions and U.S. Patent No. 4,796,930 and U.S. Patent No. 5,106,251.

Claim Chart Comparison of Claim 28 of the '619 Patent and Patentee's Admissions and U.S. Patent No. 4,796,930 and U.S. Patent No. 5,106,251.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5-7, 21, 23-25, 41-44, 46, 80 and 86 is confirmed.

Claims 1-4, 8-20, 22, 26-40, 45, 47-79 and 81-85 are cancelled.

\* \* \* \* \*